March 15, 1955
D. R. HARWIN ET AL
2,703,909
APPARATUS AND METHOD FOR PRODUCING
SPONGE RUBBER CARPET UNDERLAY
Filed Jan. 26, 1953
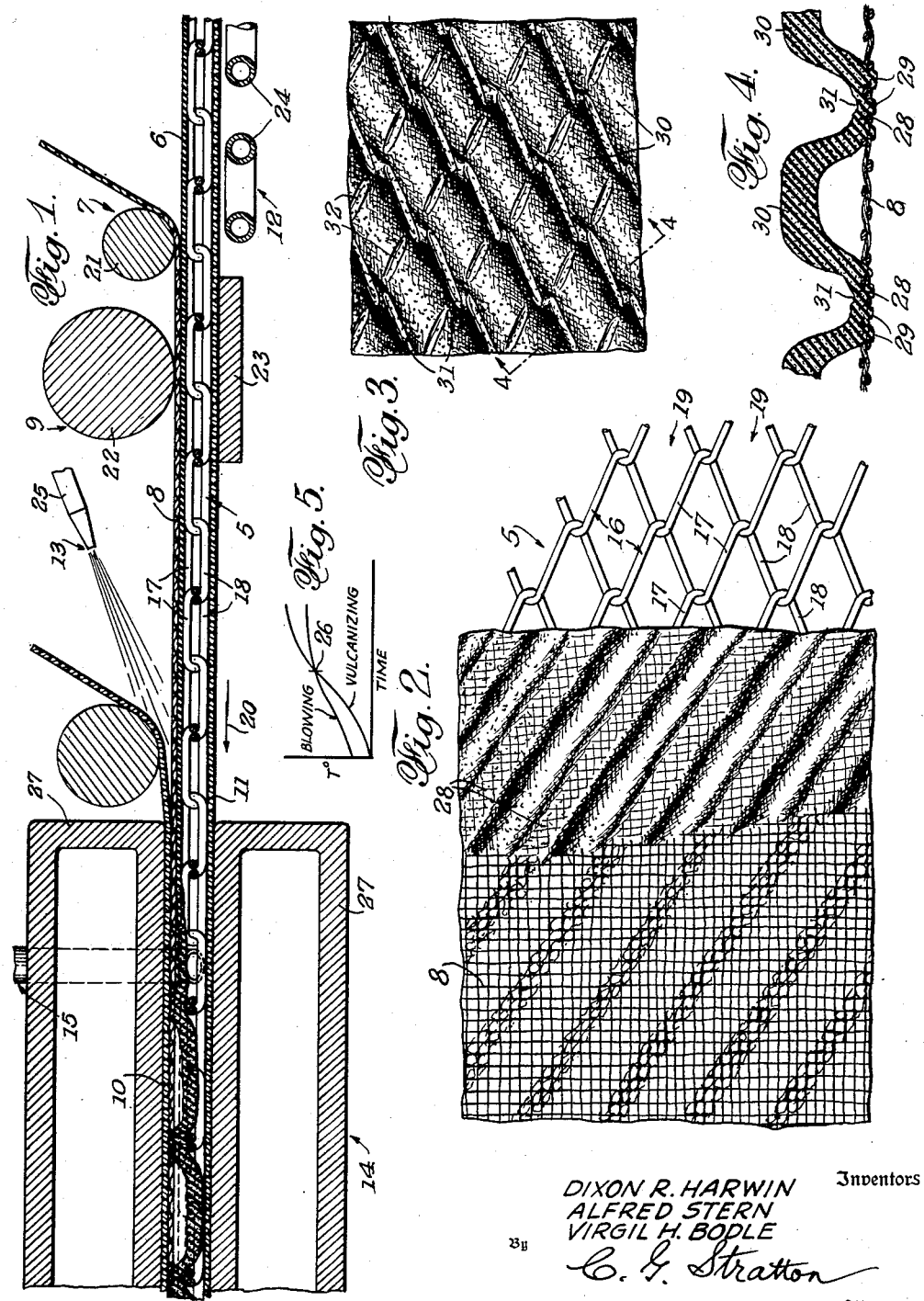
Inventors
DIXON R. HARWIN
ALFRED STERN
VIRGIL H. BODLE
By C. G. Stratton
Attorney

United States Patent Office 2,703,909
Patented Mar. 15, 1955

2,703,909

APPARATUS AND METHOD FOR PRODUCING SPONGE RUBBER CARPET UNDERLAY

Dixon R. Harwin, Alfred Stern, and Virgil H. Bodle, Los Angeles County, Calif., assignors to National Sponge Cushion Co., Inc., Los Angeles, Calif., a corporation of California Application January 26, 1953, Serial No. 333,182

11 Claims. (Cl. 18—6)

This invention relates to apparatus for producing fabric-backed sponge rubber sheets more particularly adapted for use as carpet underlay and to a method for producing such sheets.

The product herein contemplated comprises a coarse-meshed backing and a facing of sponge rubber that has a multiplicity of headed projections extending through the interstices of the backing and has a serpentine cross-sectional form that defines a series of parallel semi-tubular portions that are connected by intervening portions, the latter portions having said projections whereby the backing and facing are mechanically interlocked.

It is an object of the present invention to provide apparatus for producing a product, as above defined.

Another object of the invention is to provide apparatus for producing a fabric-backed sponge rubber sheet in a continuous manner and in sheets having indeterminate length.

A further object of the invention is to provide a novel method for producing the above-described sheet.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention which is given by way of illustration or example only.

In the drawing, like reference characters designate similar parts in the several views.

Fig. 1 is a broken longitudinal sectional view of apparatus according to the present invention.

Fig. 2 is a fragmentary plan view of the product produced in said apparatus together with a travelling mold on which the same is produced.

Fig. 3 is fragmentary face view of said product, the view showing the opposite side of Fig. 2.

Fig. 4 is an enlarged cross-sectional view as taken on line 4—4 of Fig. 3.

Fig. 5 diagrammatically, depicts the blowing and vulcanizing characteristics of the sponge rubber.

The apparatus that is illustrated comprises, generally, a continuously moving mold 5 on the upper face of which is supported, and, therefore, carried by said mold, a sheet of uncured sponge rubber 6, means 7 to guide a fabric sheet 8 in superimposed position atop sheet 6, means 9 to press fabric sheet 8 against rubber sheet 6 during movement of mold 5, an upper web 10 and a lower web 11 moving with the mold and between which said mold and sheets 6 and 8 are disposed, means 12 to pre-heat the mold, means 13 to cool rubber sheet 6, means 14 to apply blowing and vulcanizing heat to said sheet 6, and means 15 to apply negative pressure or vacuum to the sheet 6 while the same is moving through the heat-applying means 14.

While any suitable articulated mold, having spaces therein to accommodate the increased thickness of the sponge rubber when the same blows or expands under the heat of means 14, may be used, it is preferred that the mold 5 be in the form of a link chain such as illustrated in the drawing. The mold that is shown comprises conventional wire fencing material in which adjacent lengths of wire 6 are bent to have a serpentine or zig-zag form and the apices of these wires are interlaced, as best seen in Fig. 2. It will be noted that each wire 16 has legs or portions 17 all lying in one plane and legs or portions 18, alternate with portions 17, also all lying in one plane but spaced from the plane of portions 17. Since the respective portions 17 and 18 are disposed at opposite angles with respect to the length of the mold, the wires 16 so interlace that a set of angularly directed channels 19 is defined between the portions 17 of the successive wires 16 and a similar, but oppositely disposed and directed channel is defined between the portions 18. In the present instance, the first-mentioned set of channels 19 is important in the present apparatus since the portions 17 reside in the upper of the two planes of portions 17 and 18.

Since the uncured rubber sheet 6 is disposed on legs or portions 17, there is a set of channels or spaces 19 beneath said sheet and into which the same is adapted to blow or expand when heated by means 14. It will be clear, therefore, that a suitable mold will have spaces to accommodate the expanding sponge rubber regardless whether or not such spaces are in the form of channels. Also the angular direction of such spaces may be varied.

The mold 5 is continuously moved in the direction of arrow 20 and, while not shown, it will be realized that the same is endless. The rubber sheet 6 is fed onto the upper legs or portions 17 of the wires 16 which, thereby, support said sheet. In practice, this sheet is fed off a roll of this material which is formed from crude coagulated baled rubber that is first plasticized to "break the nerve" or soften it and then compounded with a blowing agent, such as soda bicarbonate or sodium carbonate and/or with other blowing agents, and activated with certain acids, such as stearic, oleaic, or acetic acid, for the purpose of causing the sheet 6, formed from said compound, to blow and vulcanize substantially at the same time, when subjected to heat in the range of 300° to 370° F.

Practice has shown that, by using a greater amount of accelerator in the compound than is ordinarily used, say 2% to 3% by weight of the rubber, and 3.75% to 4% of sulphur, the mentioned substantially simultaneous blowing and vulcanizing under the heat given above, results in a fuller expansion of the gases generated in the sponge, and more uniformity in the size of the resultant pores or cells in the blown material. The accelerator may comprise a combination of Captax, Altex, Ledate and Actone and it is thought that the urea in the last-named induces cell uniformity and, perhaps, a slight or partial vulcanization before full blowing is effected.

The means 7 is shown as a roller 21 beneath which the fabric sheet 8 is trained and fed over the top of rubber sheet 6. The means 9 comprises a weighted roller 22 that rests against fabric sheet 8 to firmly roll press the same against rubber sheet 6, a platen 23 below the mold cooperating with roller 22 to create such pressure. In any of the usual manners, webs 10 and 11, which are endless, are placed above and below the mold 5 and sheets 6 and 8 and move therewith. These webs are preferably closely woven fabrics that are substantially impervious to liquids and gases and constitute the closure members for the travelling mold assembly above described. However, these webs will transmit heat.

The means 12 may comprise steam circulating pipes 24 positioned immediately below mold 5 and serves to heat said mold before the same reaches the heating means 14. By this, or comparable means, the mold is pre-heated to aid initiation of blowing and vulcanizing of the sponge when the same reaches heating means 14.

In order to carry the heat into the sponge faster and to set up the mentioned slight vulcanization before blowing occurs, it has been found advantageous to spray a soap water vapor onto the mold at anytime before the same reaches the pre-heating stage and before the rubber sheet is applied. This coating of soap water vapor, in addition to aiding heat transmission to the sponge, inhibits adhesion of the sponge to the mold, and helps remove dead air from wires 16 that comprise the mold.

The means 13 comprises one or more nozzles 25 (the number being dependent on the width of the mold assembly) for directing a continuous stream of high pressure air, carbon dioxide, or other suitable gas against the upper surface of rubber sheet 6 through the interstices of fabric sheet 8. Since the latter is coarse-meshed, as best seen in Figs. 2 and 4, said stream of air is quite effective on sheet 6. Said stream is so directed that, as shown in Fig. 1, the same enters also beneath upper web 10 and, for a short distance, is carried into the heating means 14. Thus, while the bottom surface of rubber sheet 6 is preheated by the mold 5 under heat supplied by means 12, the upper surface of said sheet is cooled by the means 13.

Because of such cooling, blowing and full vulcanizing is retarded until the rubber sheet has effected a material penetration or entrance into heating means 14. Also, the use of such means permits running the heating means 14 at a higher temperature and the same controls uniformity of heat distribution and blowing across the width of the mold assembly. Further, regulation of means 13 provides for a rapid adjustment of effective heat in means 14, whereas attempting to raise or lower the heat in said means ordinarily entails a considerable time lag that results in a slow and impracticable regulation. Therefore, while the heat in means 14 may be supplied on a constant basis, the effective heat may be quickly changed by changing the amount of pressure gases from means 13.

In this connection, reference is made to Fig. 5 wherein it will be seen that, as sheet 6 moves through heating means 14, the curves representing blowing and vulcanizing of said sheet intersect or cross at a point 26 which represents the desired time (penetration into means 14) and the desired temperature at which substantially simultaneous blowing and vulcanization occurs. Should the means 14 provide insufficient heat, the vulcanizing curve will be pushed to the right and blowing will occur first. Should means 14 supply too much heat, vulcanization would occur before blowing. In either case, the resultant product would be defective, being either too fully blown and not properly vulcanized or not fully blown because of premature vulcanization.

From the foregoing, it will be clear that the time and temperature, represented by point 26, can be effectively controlled by regulation of means 13, to move the vulcanizing curves to the right or left, as desired, providing the heat supplied to means 14 is initially higher than the minimum heat desired. In other words, the heat in means 14 can be run abnormally high and the same tempered or reduced by means 13 to obtain optimum results in the product.

The means 14 is shown as a pair of steam chests 27, one on each side of the moving mold assembly, and which serves to confine said assembly as the same slowly moves therebetween. As the sheet 6 moves into the space between said chests and is subjected to the heat of the latter, as above discussed, said sheet expands, by reason of the volatiles therein, into the channels 19 of mold 5. Since wire legs or portions 17 confine spaced portions of said sheet against mesh fabric 8, as along diagonal portions 28, projections 29 of said portions enter the interstices of said fabric (see Fig. 4) and become headed over, as shown, when encountering the bottom surface of web 10. Thus, as the rubber blows or expands, the resultant sponge becomes mechanically interlocked with fabric 8 along the diagonal portions 28.

Between the latter portions, the sponge rubber expands into channels 19 and, thereby, forms semi-tubular portions 30 that alternate with portions 28. Since these portions 30 are not initially in contact with the mold but rather overstand the channels 19 therein, the same expand away from fabric 8 substantially in the manner shown in Fig. 4. In Fig. 3, it will be seen that the wire portions 17 form depressions 31 in the ultimate outer face of the blown sponge and, depending on the degree of expansion of said sponge, form therein less defined depressions 32 in the crests of the semi-tubular portions 30. In fact, the configuration of the mold can be seen in said depressions 31 and 32.

Because of the instant unique design of the mold, a positive pressure is created on the proper surface of sheet 6 as it blows and a negative pressure ensues on the under surface of said sheet, particularly through the volumetric displacement of air. In the present case, this negative pressure is aided or increased by applying vacuum to the sheet as by means 15. By this means, the natural tendency of the rubber to blow into channels 19 is increased and may be rendered uniform by control of the degree of vacuum applied in means 15.

It will be clear that, after the mold assembly moves through heating means 14 and out to the left, the fabric-backed and sponge rubber-faced product is separated from the mold and rolled up in the manner of carpeting. The mold and webs 10 and 11 being endless, then return to the right and the continuous operation proceeds. While we have illustrated and described what we now contemplate to be the best mode of carrying out our invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what we claim and desire to be secured by Letters Patent is:

1. Apparatus of the character described comprising a continuously moving mold having spaced portions to support a sheet of uncured sponge rubber and spaces defined by said portions, means to apply a large-mesh fabric over the rubber sheet, means to subject the uncured rubber sheet to heat adapted to substantially simultaneously vulcanize and cause the same to blow and, thereby, expand into the spaces of the mold while the sheet and fabric are moving together with the mold, means to preheat the mold before the same reaches said heating means, and means to apply a cooling gas to the exposed surface of the rubber sheet substantially as the same enters said heating means.

2. Apparatus according to claim 1: means to apply rolling pressure on the fabric after application of the same to the rubber sheet to firmly press said fabric against said sheet.

3. Apparatus according to claim 1: means to apply vacuum to space in the heating means in which the mold with the rubber and fabric sheets thereon moves to aid the expansion of the rubber during blowing thereof.

4. Apparatus according to claim 1: a closely-woven web on each side of the mold and the rubber and fabric sheets thereon and accompanying the same into the heating means.

5. Apparatus according to claim 1: the mold comprising a series of interlaced articulated wires in which the wires are in zig-zag form and alternate portions of each wire are in spaced planes to define the mentioned sheet-supporting and space-defining portions of the mold.

6. In apparatus of the character described, a continuously moving articulated mold comprising a series of wires in zig-zag form and interconnected to each other at the apices defined by oppositely angled alternate portions of said zig-zag form, said alternate portions residing in spaced planes one above the other, and the upper portions constituting means to support a sheet of uncured sponge rubber.

7. In apparatus of the character described, a continuously moving articulated mold comprising a series of wires in zig-zag form and interconnected to each other at the apices defined by oppositely angled alternate portions of said zig-zag form, said alternate portions residing in spaced planes one above the other, and the upper portions constituting means to support a sheet of uncured sponge rubber, and said upper portions defining spaces therebetween and said spaces being adapted to accommodate expanding portions of said sheet as the same blows under heat applied to said sheet.

8. A method for producing a fabric-backed sponge rubber sheet that consists in subjecting a relatively thin sheet of uncured sponge rubber, in which is compounded an inordinately large amount of blowing agents and sulphur, to a temperature between 300° and 370° F. while a large mesh fabric sheet is disposed and held against one side of the rubber sheet throughout its heated area, and the other side of the rubber sheet is disposed on a member having recesses therein, whereby the rubber will expand in thickness in one direction into the interstices of the fabric sheet, and simultaneously expand into the recesses in said member in a direction away from the fabric sheet.

9. A method according to claim 8: directing a stream of cooling gases onto the outer surface of the rubber sheet immediately before the same is subjected to said heat.

10. A method according to claim 8: directing a stream of cooling gases onto the outer surface of the rubber sheet immediately before the same is subjected to said heat, and preheating the opposite surface of the rubber sheet.

11. A method according to claim 8: supporting the rubber sheet on a mold having spaces into which the sheet expands in said direction away from the fabric sheet, and applying soap water vapor to said mold before said rubber sheet is placed thereon to inhibit sticking of the expanding rubber to said mold.

References Cited in the file of this patent

UNITED STATES PATENTS

| | | |
|---|---|---|
| 1,842,587 | Davidson | Jan. 26, 1932 |
| 2,145,731 | Minor | Jan. 31, 1939 |
| 2,271,058 | Binns | Jan. 27, 1942 |
| 2,292,103 | Cotterman | Aug. 4, 1942 |
| 2,325,903 | Blair et al. | Aug. 3, 1943 |
| 2,338,490 | Cunnington | Jan. 4, 1944 |
| 2,583,341 | Reese | Jan. 22, 1952 |
| 2,648,619 | Alderfer | Aug. 11, 1953 |